April 1, 1924.
H. DE OLANETA
1,488,908
DRY CELL
Filed Aug. 18, 1920
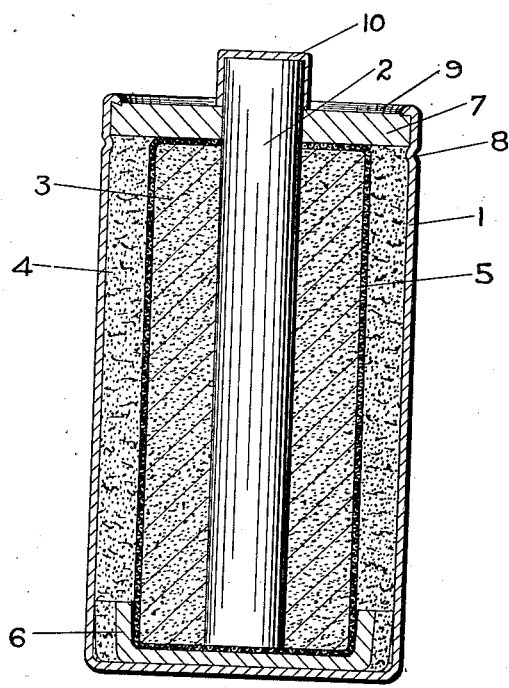
Inventor
Harold de Olaneta
By Henry E. Rockwell
Attorney Patented Apr. 1, 1924.

1,488,908

UNITED STATES PATENT OFFICE.

HAROLD DE OLANETA, OF NEW HAVEN, CONNECTICUT, ASSIGNOR TO WINCHESTER REPEATING ARMS COMPANY, OF NEW HAVEN, CONNECTICUT.

DRY CELL.

Application filed August 18, 1920. Serial No. 404,380.

*To all whom it may concern:*

Be it known that I, HAROLD DE OLANETA, a citizen of the United States, residing at New Haven, county of New Haven, State of Connecticut, have invented certain new and useful Improvements in Dry Cells, of which the following is a specification.

This invention relates to galvanic cells and more particularly to dry cells.

In dry cells of the type now found on the market in large numbers, and especially those used for pocket flash lights or hand lamps, the zinc electrode is in the form of a cup in which are contained a carbon electrode with a surrounding body of depolarizing material and an exciting paste interposed between the depolarizing material and the side wall of the cup. The depolarizing material usually consists of manganese dioxid and carbon or graphite in its crystalline form, which is formed into a block or cartridge about a carbon electrode, and is contained within a bag of cheese cloth or the like.

It is particularly with this depolarizing material that this invention is concerned. As above stated, it has not been customary in the past to use the carbon or graphite in its amorphous form for the reason that the use of the carbon in this form would usually give the cells such high internal resistance that such use would not be practicable. However, I have discovered that the employment of a relatively large amount of calcium chlorid in the depolarizing mix will render it possible to use the manganese dioxid and the graphite in their amorphous form without such deleterious effects as increasing the internal resistance of the cell or reducing the strength of the current obtained from the same.

The exciting paste in cells of this type usually contains a solution of sal ammoniac, which is the principal exciting means and a solution of zinc chlorid which serves to keep the paste moist. It may be, however, that the sal ammoniac usually found in the paste will be placed initially in the depolarizing material, as set forth in my copending application, Serial No. 346,694, filed December 22, 1919.

One of primary objects of this invention is to provide an improved dry cell of the type described.

A further object of this invention is to provide a dry cell, which will be economical to manufacture, and which will have a longer life than dry cells now on the market.

A still further object of this invention is to provide a dry cell of the type described, which will have an increased shelf life.

A still further object of the invention is to provide a dry cell of the type described, in which substances in their amorphous form may be used in the depolarizing mix.

With these and other objects in view, the invention consists in the novel features to be hereinafter described and claimed.

The accompanying drawing shows a vertical central section of a dry cell made in accordance with the invention.

The cell comprises the usual zinc cup 1, constituting one electrode. The second electrode is in the form of a carbon pencil 2, which has tamped about the same a block or cartridge 3 of suitable depolarizing material. The exciting paste 4 is interposed between the depolarizing cartridge and the side wall of the cup. The depolarizing cartridge is usually contained in a bag 5 of cheese cloth or the like. It is centered in the cup at the bottom by a suitable centering washer 6. At the top of the cell, the latter is sealed in any suitable manner as by a preformed seal or plug 7 of a suitable insulating material such as bakelite, or other phenolic condensation product or an insulating film, which is supported upon the cartridge and upon a shoulder 8, formed upon the interior wall of the cup. The closure member or seal 7 is retained in this position in any suitable way. In the form shown, the edge of the cup is turned or spun over as at 9 to lie above the seal. A contact member 10 is provided at the top of the carbon electrode.

In carrying out my invention, I preferably provide a paste which is devoid of sal ammoniac. The paste is preferably composed of wheat flour or some other cereal, zinc chloride solution and a mercury compound. In making up a batch of paste for the manufacture of these cells, I mix together, for example, 12.5 kilograms of wheat flour, 50 litres of zinc chlorid solution at 27 Baumé, and 12.5 grams of mercuric chlorid. The ingredients are mixed together until all of the flour is dispersed, and the mass is stirred, while being cooked, until a stiff paste is formed. The cooking is effected before the paste is placed in the cell.

The depolarizing body preferably comprises a mixture of amorphous manganese dioxid, amorphous graphite, and an electrolytic salt mixture containing sal ammoniac or a similar salt such as zinc chlorid, and a relatively large amount of calcium chlorid. These are preferably mixed in the following proportions, by weight,

| | Lbs. |
|---|---|
| Amorphous manganese dioxid hydrate | 20 |
| Amorphous graphite | 45 |
| Calcium chlorid | 3¾ |
| Sal ammoniac | 15 |

These ingredients are mixed with water until the mass is plastic and homogeneous, whereupon it is formed into a block or cartridge 3 about the carbon electrode 2 in a manner well understood in the art.

The amount of calcium chlorid which may be used with good results in a mixture containing the above amounts of the other ingredients varies from three-fourths of one pound to five pounds and hence the salt mixture of the calcium chlorid and ammonium chlorid may contain from five to thirty-five per cent calcium chlorid, and beneficial results obtained. I have found, however, that when mixed in the proportions of three and three-fourths parts of calcium chlorid to fifteen parts of ammonium chlorid a cell of excellent quality is produced.

The relatively large amount of calcium chlorid used in the above mixture renders possible the use of the amorphous manganese dioxid and graphite without increasing the resistance of the cell, and by its use a cell is obtained which has a longer shelf life, and the light obtained when such a cell is used in a hand lamp is of increased brilliancy. The increased brilliancy of the light is perhaps obtained at the expense of a slight loss in the life of the cell, but this is more than offset by the fact that the life of cells made from amorphous substances is much greater than the life of cells in which the crystalline substances are used.

The use of calcium chlorid in the electrolyte of dry cells has been attempted previously in small quantities, but has not been successful, because of the fact that it usually will set up local action and in this way will be deleterious to the working of the cell. This substance has also appeared as a troublesome impurity in the manganese depolarizer in the manufacture of dry cells and it has always been necessary to get rid of it in some manner in order to prevent its setting up local action within the cell.

It is well known that a substance in its amorphous state is more easily broken down and the energy derived therefrom than when in crystalline form and for this reason it is desirable to use substances in this form when possible. Moreover as amorphous graphite and manganese dioxid hydrate occur as by-products of some industries, they are obtained economically in this form. The use of these substances is, at once recognized as highly desirable once their deleterious effect of increased internal resistance has been overcome. As stated, this use has been made possible by the addition, to the depolarizing mix, of a relatively large amount of calcium chlorid, which I have discovered will not set up local action when used in this manner.

It will be apparent that by providing a paste initially devoid of the electrolytic salt which is placed in the cartridge of depolarizing material, I have constructed a cell which will not reach its maximum efficiency when first assembled, but will reach such a condition after a considerable lapse of time, as explained in my previous application referred to above. This is due to the fact that the electrolytic salt must traverse the paste before it reaches the zinc and acts thereupon. Thus the active life of the cell in the hands of the consumer is greatly increased.

While I preferably use a preformed plug, 7, of insulating material, such as an insulating fibre, or an artificial resin, such as bakelite or condensite, to seal the upper open end of the zinc cup, it is to be understood that any suitable means may be used for this purpose. For instance a pitch or wax seal may be used.

While I have shown and described a preferred embodiment of my invention it will be understood that I do not intend to be limited to exact details shown as various changes may be made in the details of procedure and in the composition and arrangement of parts without departing from the scope of my invention as set forth in the appended claims.

I do not claim herein a dry cell having the electrolytic material in the depolarizing mix only, as claimed in my copending application, Serial No. 346,694, filed December 22, 1919, nor do I claim broadly herein a depolarizing material for a dry cell composed of manganese dioxid, carbon and electrolytic material of the character claimed in my copending application, No. 378,456, filed May 3, 1920, nor do I claim herein a precooked paste for dry cells initially devoid of ammonium chlorid, as claimed in my application, No. 378,457, filed May 3, 1920.

What I claim is:

1. In a dry cell, a zinc cup, a carbon electrode therein, a depolarizing body about the electrode containing calcium chlorid prior to activity in the cell and a paste interposed between the cup and the depolarizing body.

2. In a dry cell, a zinc cup, a carbon electrode therein, a depolarizing body about the electrode containing prior to activity in the cell up to 6% of calcium chlorid, and a paste interposed between the depolarizing body and the cup.

3. In a dry cell, a zinc cup, a carbon electrode therein, a depolarizing body about the electrode containing amorphous manganese hydrate, amorphous graphite and calcium chlorid.

4. A depolarizing body for a dry cell which contains when placed in the cell an electrolyte salt composed of calcium chlorid and ammonium chlorid.

5. A depolarizing body for a dry cell which contains amorphous manganese hydrate, amorphous graphite and an electrolyte salt composed of calcium chlorid and ammonium chlorid.

6. A depolarizing body, for a dry cell, containing approximately 20 units of amorphous manganese dioxid, 45 units of amorphous graphite, 15 units of ammonium chlorid and 3¾ units of calcium chlorid.

7. A depolarizing body for a dry cell containing an electrolyte salt mixture, which contains up to 35% of calcium chlorid.

8. A depolarizing body for a dry cell containing an electrolyte salt mixture, which contains at least 5% of calcium chlorid.

9. A depolarizing body for a dry cell containing an electrolyte salt composed of from ¾ of one part to five parts of calcium chlorid and substantially fifteen parts of ammonium chlorid.

10. In a dry cell, a zinc cup, a carbon electrode therein, a depolarizing body about the electrode containing calcium chlorid and ammonium chlorid, and a paste interposed between the cup and the depolarizing body, said paste being devoid of ammonium chlorid when the cell is assembled.

11. A depolarizing mix for dry cells containing a salt mixture, said mixture containing from 5 to 35 per cent calcium chlorid.

12. In a dry cell, a zinc cup, a carbon electrode therein, a depolarizing body about the electrode and a paste interposed between the cup and the depolarizing body, the principal electrolyte being placed in the depolarizer when the cell is assembled and composed in part of calcium chlorid.

13. In a dry cell, a zinc cup, a carbon electrode therein, and a depolarizing body about the electrode containing graphite and calcium chlorid.

In witness whereof, I have hereunto set my hand on this 31 day of July, 1920.

HAROLD DE OLANETA.